(12) United States Patent
Hadar et al.

(10) Patent No.: US 8,069,242 B2
(45) Date of Patent: Nov. 29, 2011

(54) SYSTEM, METHOD, AND SOFTWARE FOR INTEGRATING CLOUD COMPUTING SYSTEMS

(75) Inventors: Ethan Hadar, Nesher, IL (US); Carrie E. Gates, New York, NY (US); Kouros Hodaee Esfahany, Huntington, NY (US); Michael Ralph Chiaramonte, Nesconset, NY (US); Efraim Moscovich, Teaneck, NJ (US); Gregory L. Bodine, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 12/560,754

(22) Filed: Sep. 16, 2009

(65) Prior Publication Data
US 2010/0125664 A1      May 20, 2010

Related U.S. Application Data

(60) Provisional application No. 61/114,876, filed on Nov. 14, 2008.

(51) Int. Cl.
*G06F 15/173*      (2006.01)

(52) U.S. Cl. .................. 709/224; 709/223; 709/227

(58) Field of Classification Search .......... 709/223–224, 709/220, 227
See application file for complete search history.

(56) References Cited

U.S. PATENT DOCUMENTS

| | | | |
|---|---|---|---|
| 7,596,620 B1* | 9/2009 | Colton et al. ................. | 709/223 |
| 2008/0215713 A1* | 9/2008 | Cannon et al. ................ | 709/221 |
| 2009/0300635 A1* | 12/2009 | Ferris ........................... | 718/104 |
| 2010/0042720 A1* | 2/2010 | Stienhans et al. ............ | 709/226 |
| 2010/0050172 A1* | 2/2010 | Ferris ............................... | 718/1 |
| 2010/0064033 A1* | 3/2010 | Travostino et al. ........... | 709/220 |

* cited by examiner

*Primary Examiner* — Philip B Tran
(74) *Attorney, Agent, or Firm* — Baker Botts L.L.P.

(57) ABSTRACT

A method for integrating cloud computing systems includes establishing a connection between a cloud computing system architecture and cloud computing systems. Each of the cloud computing systems includes computing resources. The method further includes integrating the computing resources with an external integration architecture by establishing a second connection between the cloud computing system architecture and the external integration architecture. The external integration architecture includes IT Infrastructure Library (ITIL) software components. The cloud computing system architecture includes management components that provide integration points to connect the ITIL software components with the computing resources.

20 Claims, 4 Drawing Sheets

US 8,069,242 B2

SYSTEM, METHOD, AND SOFTWARE FOR INTEGRATING CLOUD COMPUTING SYSTEMS

RELATED APPLICATIONS

This application claims the benefit under 35 U.S.C. §119 (e) of the priority of U.S. Provisional Application No. 61/114,876 filed Nov. 14, 2008, entitled "System, Method, and Software for Object-Based Cloud Computing Management and Reference Architecture."

TECHNICAL FIELD

The present invention relates generally to computer management, and more particularly to a system, method, and software for integrating cloud computing systems.

BACKGROUND

Cloud computing systems include computing resources. For example, cloud computing systems may include servers, network storage devices, and other information technology (IT) services. Cloud computing systems include proprietary interfaces to access their respective computing resources.

SUMMARY

According to the present invention, disadvantages and problems associated with previous techniques for integrating cloud computing systems may be reduced or eliminated.

In certain embodiments, a method for integrating cloud computing systems includes establishing a connection between a cloud computing system architecture and cloud computing systems. Each of the cloud computing systems includes computing resources, software resources, and services. The method further includes integrating the computing resources with an external integration architecture by establishing a second connection between the cloud computing system architecture and the external integration architecture. The external integration architecture includes IT Infrastructure Library (ITIL) software components. The cloud computing system architecture includes management components that provide integration points to connect the ITIL software components with the computing resources.

Certain embodiments of the present invention may provide one or more technical advantages. Conventional cloud computing systems include computing resources and services including Software as a Service (SaaS), Hardware as a Service (HaaS), Platform as a Service (PaaS), and Data as a Service (DaaS), and other forms of resources and services such as utility computing. These services include the packaging of computing resources as a metered service. For example, cloud computing system providers may offer these services to customers and charge the customers for their specific use of computing resources.

The current invention provides advantages over standard technologies by providing a system and method, described using a cloud computing system, for comprehensive usage of management, security, and governance systems. Enterprise IT Management (EITM) software is designed to automate business processes and accelerate adoption of IT service strategies based on certain best practice principles. For example, ITIL software components provide a best practice framework for driving business value by helping IT organizations standardize processes, share common terminology, and provide integrated Service Management across an IT organization. Certain embodiments of the present invention provide integration points to connect ITIL software components with cloud computing resources by providing management components that abstract and encapsulate certain aspects of cloud computing systems. Thus, the current invention is directed to adapters that bridge an architectural layer that encapsulates and abstracts cloud computing disadvantages and problems while still integrating with well-known IT technology. Therefore, the adapters may increase performance and improve efficiency of strategic initiatives and financial costs.

Certain embodiments of the present invention may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1:
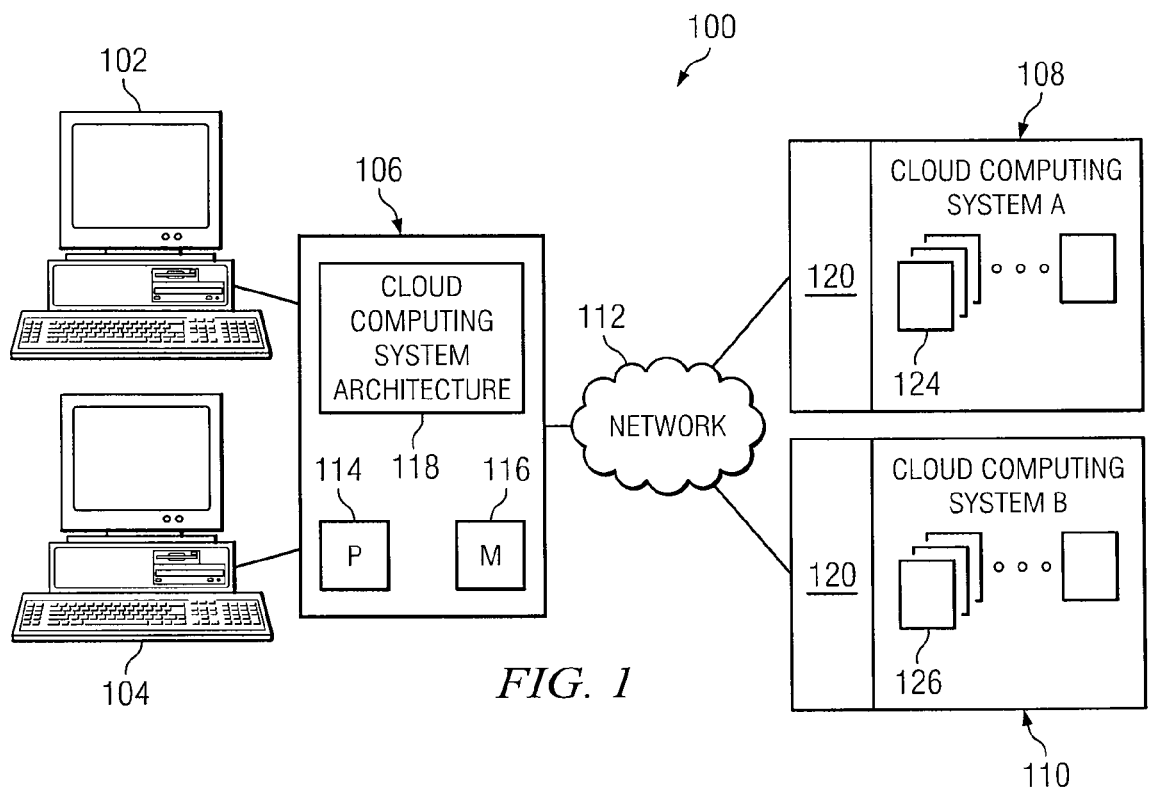
FIG. 1 illustrates an example system for integrating cloud computing systems, according to certain embodiments of the present invention.

FIG. 1 illustrates an example system 100 for integrating cloud computing systems, according to certain embodiments of the present invention. System 100 may include one or more user systems 102 and one or more administrative systems 104, one or more server systems 106, one or more cloud computing systems 108 and 110, and a network 112. Although this particular implementation of system 100 is illustrated and primarily described, the present invention contemplates any suitable implementation of system 100 according to particular needs.

In general, system 100 is operable to integrate between ITIL software components (such as ITIL V3 and any future versions of ITIL) and cloud computing systems. In certain embodiments, system 100 includes a cloud computing system architecture for integrating cloud computing systems with ITIL software components. For example, an external integration architecture may include several ITIL software components. According to certain embodiments of the present invention, adapters are created in a cloud computing system architecture that bridge the architectural layer that encapsulates and abstracts the cloud computing systems while still integrating with enterprise ITIL software components. Thus, certain embodiments of the invention provide a set of components for life cycle phases of ITIL service management, from strategy to design, transition, and operation. In certain embodiments, the cloud computing system architecture is mapped to the different layers of the cloud computing systems, thus serving IT shops and workers that rent cloud computing resources and manage the cloud computing systems within their own IT organization in an abstract manner. In certain embodiments, the cloud computing system architecture may serve the cloud computing system providers that manage their cloud computing systems and provide ITIL integration points to their customers.

System 100 may include one or more user systems 102 and one or more administrative systems 104. "User system 102" and "user of user system 102" may be used interchangeably. A user of user system 102 may include, for example, a human user or a computer program or other suitable software module for automatically interacting with user system 102. Likewise, "administrative system 104" and "user of administrative system 104" may be used interchangeably. A user of administrative system 104 may include, for example, a human user or a computer program or other suitable software module for automatically interacting with administrative system 104.

Each user system 102 and administrative system 104 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of administrative system 104. Each computer system may include a personal computer, workstation, network computer, kiosk, wireless data port, personal data assistant (PDA), one or more processors within these or other devices, or any other suitable processing device. As an example, system 100 may include multiple distributed user systems 102 and/or administrative systems 104. User systems 102 and administrative systems 104 may be physically distributed, being in different locations geographically remote from each other and from the other components of system 100, or logically distributed, being at approximately the same location as other user systems 102 and administrative systems 104 and the other components of system 100. For simplicity, the one or more user systems 102 and administrative systems 104 of system 100 are referred to throughout this description primarily in the singular. Although user system 102 and administrative system 104 are illustrated and primarily described as being separate, it is understood that the computer systems and the functionality associated with user system 102 and administrative system 104 may be combined or separated in any suitable manner.

System 100 may include one or more server systems 106, referred to primarily in the singular throughout the remainder of this description. Server system 106 may include one or more electronic computing devices operable to receive, transmit, process, and store data associated with system 100. For example, server system 106 may include one or more general-purpose PCs, Macintoshes, workstations, Unix-based computers, server computers, one or more server pools, or any other suitable devices. In certain embodiments, server system 106 includes a web server. In short, server system 106 may include any suitable combination of software, firmware, and hardware. Although a single server system 106 is illustrated, the present invention contemplates system 100 including any suitable number of server systems 106. Moreover, although referred to as a "server system," the present invention contemplates server system 106 comprising any suitable type of processing device or devices.

Server system 106 may be communicatively coupled to cloud computing systems 108 and 110 via network 112. Although not illustrated, user system 102 and administrative system 104 may be communicatively coupled to one another as well as to server system 106 via network 112. Network 112 facilitates wireless or wireline communication. Network 112 may communicate, for example, IP packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Server system 106 may include a processing module 114 and a memory module 116. Processing module 114 may include one or more microprocessors, controllers, or any other suitable computing devices or computing resources. Processing module 114 may work, either alone or with other components of system 100, to provide a portion or all of the functionality of system 100 described herein. Memory module 116 may take the form of volatile or non-volatile memory including, without limitation, magnetic media, optical media, random access memory (RAM), read-only memory (ROM), removable media, or any other suitable memory component. Although a single server system 106 is illustrated, the present invention contemplates system 100 including any suitable number of server systems 106. Moreover, although referred to as a "server system," the present invention contemplates server system 106 comprising any suitable type of processing device or devices.

System 100 may include one or more cloud computing systems 108 and 110. Cloud computing systems 108 and 110 may include one or more electronic computing devices operable to receive, transmit, process, and store data associated with system 100. For example, cloud computing systems 108 and 110 may include one or more general-purpose PCs, Macintoshes, workstations, Unix-based computers, server computers, one or more server pools, or any other suitable devices. In short, cloud computing systems 108 and 110 may include any suitable combination of software, firmware, and hardware. It should be noted that although two cloud computing systems 108 and 110 are illustrated, any suitable number of cloud computing systems may be included in system 100. In addition, there may be multiple groups of cloud computing systems in system 100.

In certain embodiments, cloud computing systems 108 and 110 provide computing resources 124 and 126, respectively, to user systems 102 and administrative systems 104 and charges user systems 102 and administrative systems 104 for their specific use of computing resources 124 and 126. For example, cloud computing resources 124 and 126 may include one or more virtual machines. As another example, cloud computing resources 124 and 126 may include one or more machine images. A machine image may refer to a bootable file that includes a particular configuration and operating system. As yet another example, cloud computing resources 124 and 126 may include one or more Intel x86 based servers that provide a combination of hardware and software resources.

In certain embodiments, computing resources 124 and 126 may be accessible by cloud computing interfaces 120. From the perspective of user systems 102 and administrative systems 104, renting computing resources from cloud computing interfaces 120 has implications for application providers and IT architects that develop solutions targeted for internal enterprise deployment, rather than on cloud computing systems 108 and 110. For example, an IT architect may desire to deploy web servers, load balancers, and front-end interfaces remotely on cloud computing systems 108 and 110 but keep a database in a local IT environment. Further, from an ITIL process perspective, many large organizations may implement an ITIL approach by performing well-defined automated processes. Since an ITIL process may be agnostic to platform and technological tools, it may be desirable to integrate such practices with advances in technology, such as cloud computing systems 108 and 110.

In certain embodiments, server system 106 may include a cloud computing system architecture 118. Cloud computing system architecture 118 may refer to any suitable hardware and/or software operable to integrate ITIL software components with cloud computing systems 108 and 110 and their respective computing resources 124 and 126. For example, a connection may be established between cloud computing system architecture 118 and cloud computing systems 108 and 110. A second connection may be established between cloud computing system architecture 118 and an external integration architecture that includes the ITIL software components. As described in more detail below, cloud computing system architecture 118 includes management components that provide integration points to connect the ITIL software components with computing resources 124 and 126 of cloud computing systems 108 and 110.

In certain embodiments, a secure connection may be established between cloud computing system architecture 118 and cloud computing systems 108 and 110 over network 112. For example, a secure Hypertext Transfer Protocol (HTTP) connection may be established between cloud computing system architecture 118 and cloud computing systems 108 and 110. A secure HTTP protocol refers to a protocol that provides the ability for secure transactions to take place over network 112. In alternative networks, any suitable data communications protocol may be used to establish a secure connection. Additional details of example embodiments of cloud computing system architecture 118 are discussed below with reference to FIGS. 2-9.

Figure 2:
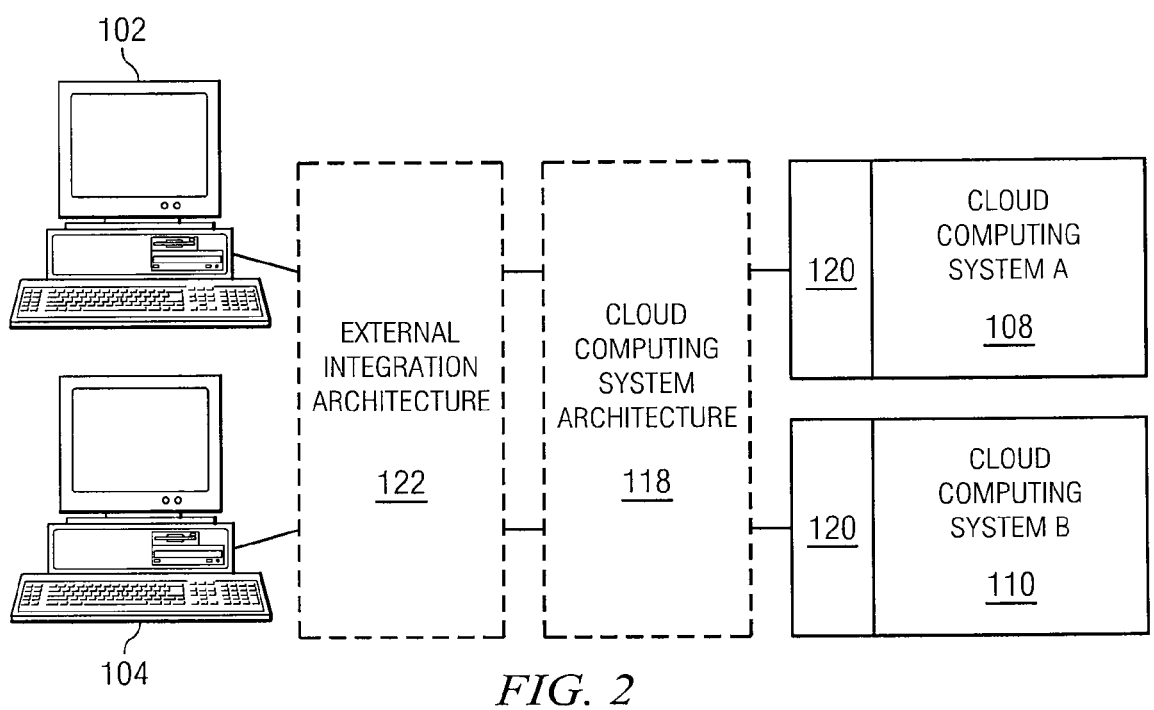
FIG. 2 illustrates an example external integration architecture and the cloud computing system architecture of FIG. 1, according to certain embodiments of the present invention.

FIG. 2 illustrates external integration architecture 122 and cloud computing system architecture 118 of FIG. 1, according to certain embodiments of the present invention. As described above, external integration architecture 122 may include several ITIL software components. For example, external integration architecture 122 may include an ITIL software component that enables organization of the IT strategies and ongoing initiatives. As another example, external integration architecture 122 may include an ITIL software component that sets and monitors agreements based on service requests, negotiates with supply chain managers, sets agreements for operations and services, and/or catalogs the results. As yet another example, external integration architecture 122 may include an ITIL software component that captures defined and offered services. As yet another example, external integration architecture 122 may include an ITIL software component that performs continuous analysis in order to evaluate service trends for optimization. As yet another example, external integration architecture 122 may include an ITIL software component that maintains the deployment of the designed services, tracking and reporting the deployed assets within an organization, and/or maintains information on the topology and system infrastructure and the life cycle for design changes and releases. As yet another example, external integration architecture 122 may include an ITIL software component that measures the services provided on an ongoing basis with the goal of ensuring a high level of quality is maintained across the IT investments, displays the overall status and health of the system to the consumer, and/or maintains ongoing provisioning, recovery, backup and redundancy of the IT assets within a datacenter, including countermeasures and remedies. As yet another example, external integration architecture 122 may include an ITIL software component that provides proactive planning capabilities through the analysis of IT behavior, detects, utilization patterns and change history, determines if Service Level Agreements (SLAs) are being met, alerts a consumer that a problem is starting to appear, which may provide the consumer with the possibility of mitigating the issue before it becomes critical. As yet another example, external integration architecture 122 may include an ITIL software component that manages users and controls their access to the resources in the system based on, for example, their organizational role. As yet another example, external integration architecture 122 may include an ITIL software component that manages the distributed data stores for the organization, provisions and allocates storage resources, and/or provides the ability to restore IT services back to operation through a workflow and life cycle of incidents that concludes with incident resolution. As described in more detail below, computing system architecture 118 includes management components that provide integration points to connect the ITIL software components with computing resources of cloud computing systems 108 and 110.

Figure 3:
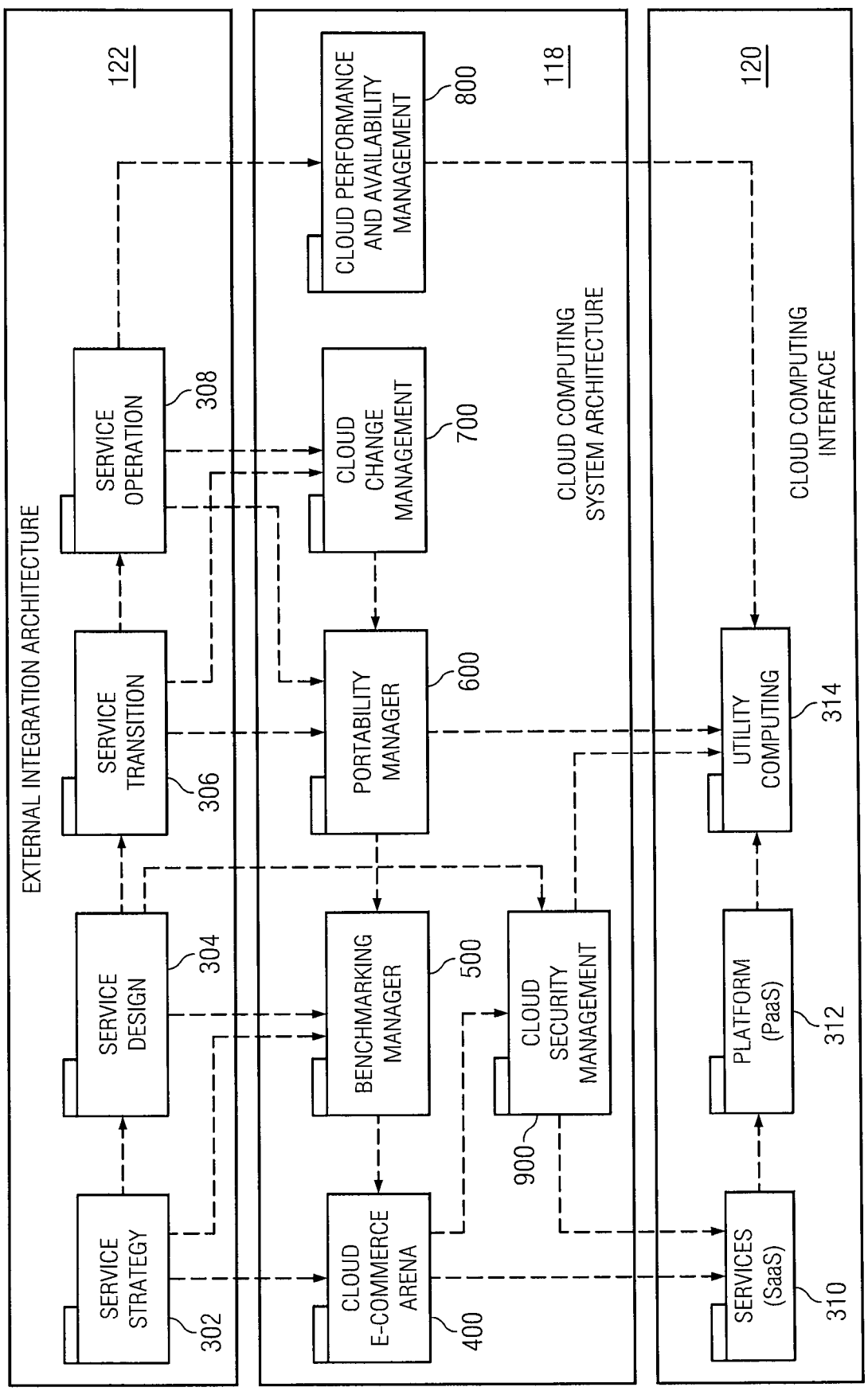
FIG. 3 illustrates example details of the external integration architecture and cloud computing system architecture of FIGS. 1 and 2, according to certain embodiments of the present invention.

FIG. 3 illustrates example details of external integration architecture 122 and cloud computing system architecture 118 of FIGS. 1 and 2, according to certain embodiments of the present invention. As described above, in certain embodiments, external integration architecture 122 may include several ITIL software components. In the illustrated embodiment, external integration architecture 122 includes a service strategy 302 component, a service design 304 component, a service transition 306 component, and a service operation 308 component. In certain embodiments, these ITIL software components may include products that may be integrated with one or more cloud computing systems with computing resources such as SaaS 310, PaaS 312, and utility computing 314 via cloud computing system architecture 118.

For example, service strategy 302 may retrieve an understanding of cloud computing system resources, including SaaS 310, PaaS 312, and utility computing 314, in order to design and understand a portfolio of PPM or financial management using a cloud e-commerce arena 400 component and a benchmarking manager 500 component. As another example, service design 304 may retrieve and evaluate computing resources, thus using benchmarking manager 500. As another example, service design 304 may define security policies through a cloud security management 900 component. In certain embodiments, benchmarking manager 500 may conduct benchmarking by querying one or more cloud computing systems using cloud e-commerce arena 400. As another example, service transition 306 may use a portability manager 600 component to conduct transitioning and provisioning of one or more computing resources, as well as handling requests for changes from a cloud change management 700 component. As another example, service operation 308 may request changes using cloud change management 700, re-provision a solution using portability manager 600, and/or monitor assets on the cloud using a cloud performance and availability management 800 component. In certain embodiments, cloud performance and availability management 800 connects to and monitors hosts on utility computing 314. In certain embodiments, portability manager 600 deploys the machine images and changes on utility computing 314. It should be noted that although a certain number of components are illustrated, any suitable number of components may be implemented. Additional details of cloud e-commerce arena 400, benchmarking manager 500, portability manager 600, cloud change management 700, cloud performance and availability management 800, and cloud security management 900 are provided below with reference to FIGS. 4-9.

Figure 4:
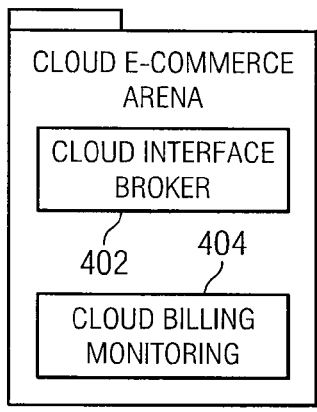
FIG. 4 illustrates example details of the cloud e-commerce arena component of the cloud computing system architecture of FIG. 3, according to certain embodiments of the present invention.

FIG. 4 illustrates example details of cloud e-commerce arena 400 of cloud computing system architecture 118 of FIG. 3, according to certain embodiments of the present invention. Cloud e-commerce arena 400 may provide capabilities for negotiation of costs and comparisons, thus enabling computing to be treated as a commodity. In the illustrated embodiment, cloud e-commerce arena 400 includes a cloud interface broker 402 component and a cloud billing monitoring 404 component. In certain embodiments, cloud e-commerce arena 400 may provide the capability to communicate with cloud computing systems and provide information to an external integration architecture, such as external integration architecture 122 of FIG. 2.

For example, cloud e-commerce arena 400 may negotiate cloud computing costs. As another example, cloud e-commerce arena 400 may allow one or more computing resources to be treated as a commodity. Cloud interface broker 402, which may connect to several cloud providers, may enable the selection of cloud computing systems, the orchestration of several options, and/or billing for the services of managing external SLAs inserted on top of the cloud computing systems. Cloud billing monitoring 404 may receive the billed payments. In sum, cloud e-commerce arena 400 provides integration points to connect ITIL software components with computing resources of cloud computing systems. It should be noted that although a certain number of components are illustrated, any suitable number of components may be implemented.

Figure 5:
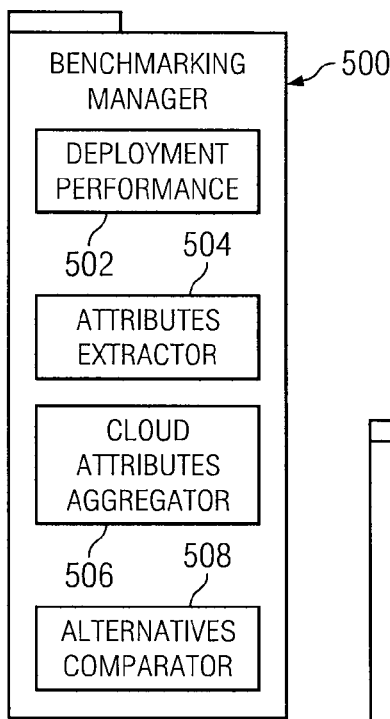
FIG. 5 illustrates example details of the benchmarking manager component of the cloud computing system architecture of FIG. 3, according to certain embodiments of the present invention.

FIG. 5 illustrates example details of benchmarking manager 500 of computing system architecture 118 of FIG. 3, according to certain embodiments of the present invention. Benchmarking manager 500 may compare published capabilities of cloud computing systems and the relevant alternatives, including future self-investments in hardware and software as well as existing investments, by enabling comparative lists of cloud computing system attributes (such as provided hardware, cost for storage, cost for usage, and network bandwidth, as examples). In the illustrated embodiment, benchmarking manager 500 includes a deployment performance 502 component, an attributes extractor 504 component, a cloud attributes aggregator 506 component, and an alternatives comparator 508 component. In certain embodiments, benchmarking manager 500 may generate a comparative list of one or more published capabilities of the cloud computing systems and provide this information to an external integration architecture, such as external integration architecture 122 of FIG. 2.

For example, attributes extractor 504 may access the non-functional characteristics of one or more cloud computing systems (such as pricing, supported hardware, SLA and quality attributes). These attributes may be provided to cloud attributes aggregator 506, which evaluates and composes accumulated values for each cloud computing system, comparing them against the customer quality attributes, which may provide customer specific prioritization of one or more cloud computing systems. The attributes may be passed to alternatives comparator 508, which may present the selected benchmarked cloud computing systems using a consistent set of ITIL metrics. As another example, the run-time performance of each cloud computing system may be tested by deployment performance 502 by testing a simple small image on different servers for time-to-value bandwidth support for deploying and removing a machine image. In sum, benchmarking manager 500 provides integration points to provide ITIL software components with information regarding computing resources of cloud computing systems. It should be noted that although a certain number of components are illustrated, any suitable number of components may be implemented.

Figure 6:
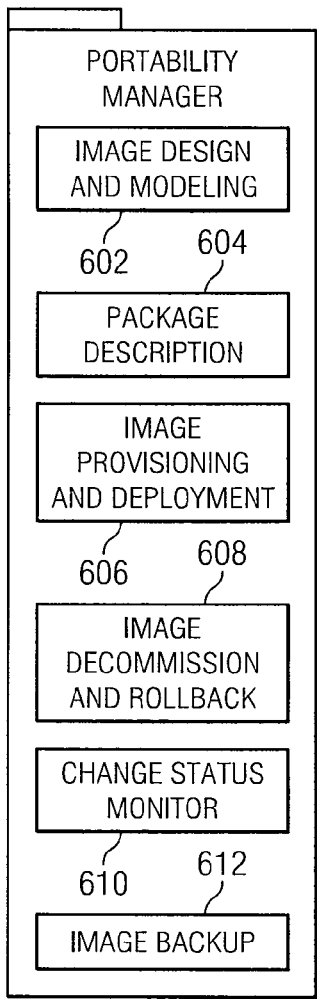
FIG. 6 illustrates example details of the portability manager component of the cloud computing system architecture of FIG. 3, according to certain embodiments of the present invention.

FIG. 6 illustrates example details of portability manager 600 of computing system architecture 118 of FIG. 3, according to certain embodiments of the present invention. Portability manger 600 may manage provisioning transformation and portability of deployed images from one cloud computing system to another, due to SLA optimizations and/or on-demand provisioning of cloud resources as a result of a shortage of resources within the customer internal data center, or other reasons, by re-packing the deployed entities according to the cloud computing system definitions. In the illustrated embodiment, portability manager 600 includes an image design and modeling 602 component, a package description 604 component, an image provisioning and deployment 606 component, an image decommission and rollback 608 component, a change status monitor 610 component, and an image backup 612 component. In certain embodiments, portability manager 600 may deploy machine images to at least one cloud computing system based on instructions from an external integration architecture, such as external integration architecture 122 of FIG. 2.

For example, if one cloud computing system is not meeting SLA requirements, portability manager 600 may repack the deployed entity according to the new cloud computing system definitions and port it to a new cloud computing system. For example, image design and modeling 602 may define a configuration model of the entities that need to be packaged. Package description 604 may generate the packaging instructions and configuration descriptions for a specific cloud computing system. Image provisioning and deployment 606 may initiate the actual rollout of a certain configured machine image for a specific cloud computing system. Image decommission and rollback 608 may remove deployed machine images from a specific cloud computing system. The status of the machine images may be monitored by change status monitor 610. Image backup 612 may use the portability mechanism to provide backup and replication functionality as part of normal business processes. In sum, portability manager 600 provides integration points to connect ITIL software components with computing resources of cloud computing systems. It should be noted that although a certain number of components are illustrated, any suitable number of components may be implemented.

Figure 7:
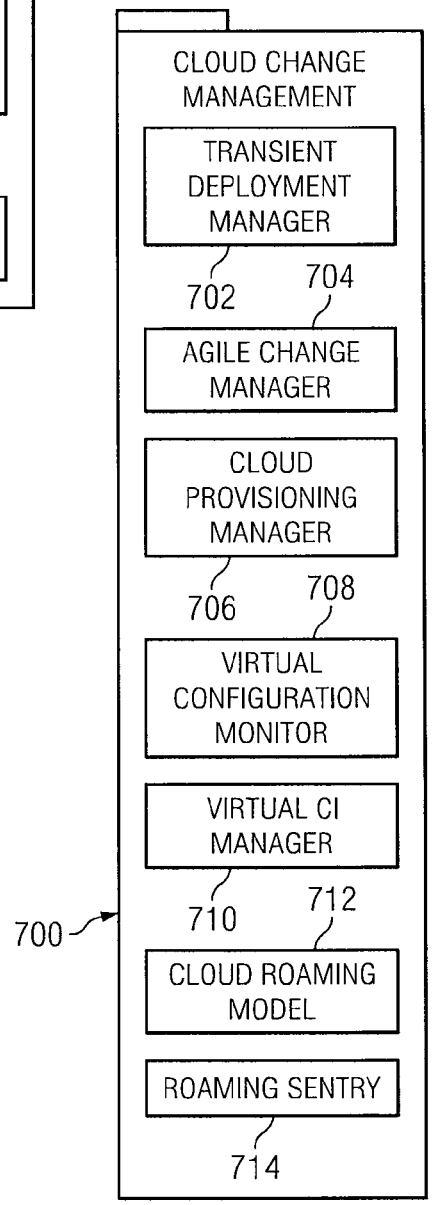
FIG. 7 illustrates example details of the cloud change management component of the cloud computing system architecture of FIG. 3, according to certain embodiments of the present invention.

FIG. 7 illustrates example details of cloud change management 700 of computing system architecture 118 of FIG. 3, according to certain embodiments of the present invention. Cloud change management 700 may manage the actual transitions and changes based on a monitored change approach, modeling the cloud computing systems to a configuration management database (CMDB). In the illustrated embodiment, cloud change management 700 includes a transient deployment manager 702 component, an agile change manager 704 component, a cloud provisioning manager 706 component, a virtual configuration manager 708 component, a virtual configuration item (CI) 710 component, a cloud roaming model 712 component, and a roaming sentry 714 component. In certain embodiments, cloud change management 700 may model at least one cloud computing system to a CMDB, manage transitions and changes to the cloud application, and capture its structure configuration for an external integration architecture, such as external integration architecture 122 of FIG. 2.

For example, transient deployment manager 702 may provide a fail-over management capability that can deploy a temporary solution on one or more cloud computing systems enabling high availability by providing a transient replacement for regular IT systems. Agile change manager 704 may enable incremental and measurable changes by comparing attributes of service quality between different implementations. Cloud provisioning manager 706 may enable the rollout of particular machine images for a particular cloud computing system. Virtual configuration monitor 708 may maintain snapshots of physical configurations over time with the goal of enabling diagnostics, discovery of assets and computing resources, root cause analysis, and e-discovery requirements. Computing resources may be extracted as managed configuration items (CI) by virtual CI manager 710, which may maintain this information for service availability. Cloud roaming model 712 may define a service configuration over virtual CIs from one or more cloud computing systems and display measured values over time, regardless of the underlying roaming structure. Cloud roaming model 712 may automatically adjust service performance based on the underlying structure. Roaming sentry 714 may limit and constrain roaming capabilities within one or more cloud computing systems as determined by governance and compliance requirements. For example, roaming sentry 714 may overcome "non-location" dependency in cases where location is of importance. In sum, cloud change management 700 provides integration points to connect ITIL software components with computing resources of cloud computing systems. It should be noted that although a certain number of components are illustrated, any suitable number of components may be implemented.

Figure 8:
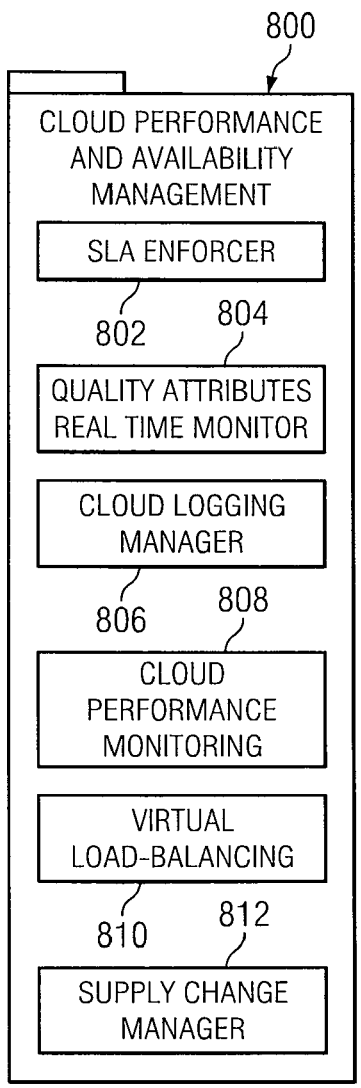
FIG. 8 illustrates example details of the cloud performance and availability management component of the cloud computing system architecture of FIG. 3, according to certain embodiments of the present invention.

FIG. 8 illustrates example details of cloud performance and availability management 800 of computing system architecture 118 of FIG. 3, according to certain embodiments of the present invention. Cloud performance and availability management 800 may monitor the status of applications, hosts and services on the cloud, and bridging this information to the IT operation tools. In the illustrated embodiment, cloud performance and availability management 800 includes an SLA enforcer 802 component, a quality attributes real time monitor 804 component, a cloud logging manager 806 component, a cloud performance monitoring 808 component, a virtual load balancing 810 component, and a supply change manager 812 component. In certain embodiments, cloud performance and availability management 800 may monitor a status of at least one application, at least one host, and at least one service of the cloud computing systems and provide this information to an external integration architecture, such as external integration architecture 122 of FIG. 2.

For example, SLA enforcer 802 may insert penalties and/or triggers a search for alternative cloud computing systems upon the services specified in an SLA not being met. Quality attributes real time monitor 804 may monitor the quality settings of the IT manager. For example, quality attributes real time monitor 804 may monitor energy measurements for the equipment being used within the cloud for purposes of compliance with environmental initiatives. Cloud logging manager 806 may extract aggregated logs and events to the customer so that the customer can integrate this information into a centralized repository. Performance metrics (e.g., availability, maximum utilization) may be measured by cloud performance monitoring 808. Virtual load-balancing 810 may enable distributed load balancers and automated failover cloud computing systems and non-cloud computing systems by provisioning of one or more of the participating servers in a grid, which is then managed as a machine image on one or more cloud computing systems. Supply change manager 812 may measure the efficiency of the supply chain by providing an extended service desk adaptor that facilitates the delegation of service desk requests into one or more cloud computing systems. In sum, cloud performance and availability management 800 provides integration points to connect ITIL software components with computing resources of cloud computing systems. It should be noted that although a certain number of components are illustrated, any suitable number of components may be implemented.

Figure 9:
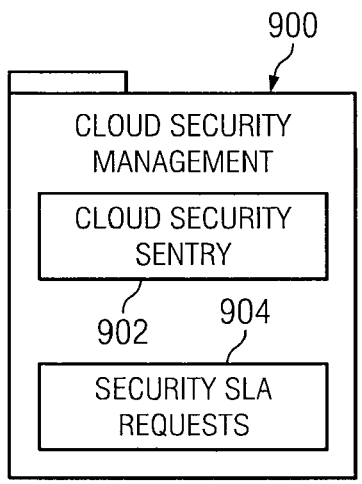
FIG. 9 illustrates example details of the cloud security management component of the cloud computing system architecture of FIG. 3, according to certain embodiments of the present invention.

FIG. 9 illustrates example details of cloud security management 900 of computing system architecture 118 of FIG. 3, according to certain embodiments of the present invention. Cloud security management 900 may provide the security aspects of controlling the entry points to the cloud computing systems. In the illustrated embodiment, cloud security management 900 includes a cloud security sentry 902 component and a security SLA requests 904 component. In certain embodiments, cloud security management 900 may provide security for an external integration architecture, such as external integration architecture 122 of FIG. 2.

For example, cloud security sentry 902 may delegate requests for access control enforcements, as well as collect observations of actual behavior by providing interception mechanisms on service calls. Cloud security sentry 902 may delegate requests for access control enforcements, collect actual behavior by providing interception mechanisms on service calls, and provide a guarded call mechanism that prevents access to the customer IT environment by one or more cloud computing systems, thus protecting the customer IT systems from the cloud computing systems. Security SLA requests 904 may act as a remote proxy for compliance access control tools. Security SLA requests 904 may mediate requests to deploy security and access control policies on roaming users, hosts, and servers. In sum, cloud security management 900 provides integration points to secure ITIL software components. It should be noted that although a certain number of components are illustrated, any suitable number of components may be implemented.

Figure 10:
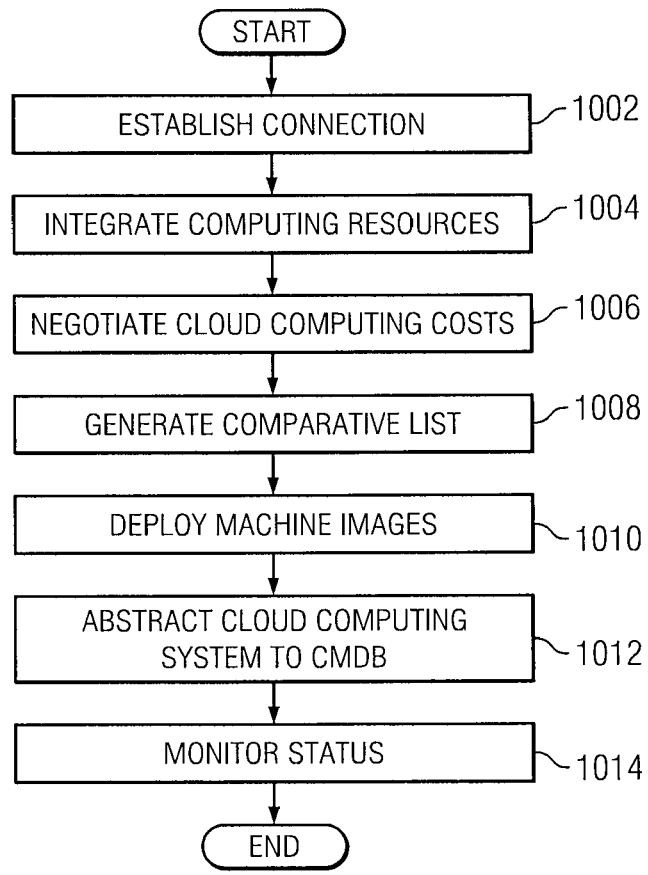
FIG. 10 illustrates an example method for integrating cloud computing systems, according to certain embodiments of the present invention.

FIG. 10 illustrates an example method for integrating cloud computing systems, according to certain embodiments of the present invention. The method begins at step 1002 where a first connection is established between a cloud computing system architecture and cloud computing systems. Each of the cloud computing systems include one or more computing resources. At step 1004, the one or more computing resources are integrated with an external integration architecture by establishing a second connection between the cloud computing system architecture and the external integration architecture. The external integration architecture includes IT Infrastructure Library (ITIL) software components. The cloud computing system architecture includes management components that provide integration points to connect the ITIL software components with the computing resources. For example, the cloud computing system architecture may include a component that negotiates cloud computing costs at step 1006. As another example, the cloud computing system architecture may include a component that generates a comparative list of one or more published capabilities of the cloud computing systems at step 1008. As yet another example, the cloud computing system architecture may include a component that deploys machine images to at least one cloud computing system at step 1010. As yet another example, the cloud computing system architecture may include a component that models at least one cloud computing system to a configuration management database (CMDB) at step 1012. As yet another example, the cloud computing system architecture may include a component that monitors a status of at least one application, at least one host, and at least one service of the cloud computing systems at step 1014. It should be understood that some of the steps illustrated in FIG. 10 may be combined, modified or deleted where appropriate, and additional steps may also be added to the flowchart. Additionally, as indicated above, steps may be performed in any suitable order without departing from the scope of the invention.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for integrating cloud computing systems, comprising:
    establishing a first connection between a cloud computing system architecture and a plurality of cloud computing systems, each of the plurality of cloud computing systems comprising one or more computing resources; and
    integrating the one or more computing resources with an external integration architecture by establishing a second connection between the cloud computing system architecture and the external integration architecture, the external integration architecture comprising a plurality of IT Infrastructure Library (ITIL) software components, the cloud computing system architecture comprising a plurality of management components that provide integration points to connect the plurality of ITIL software components with the one or more computing resources.

2. The method of claim 1, further comprising negotiating cloud computing costs.

3. The method of claim 1, further comprising generating a comparative list of one or more published capabilities of the plurality of cloud computing systems.

4. The method of claim 1, further comprising deploying machine images to at least one cloud computing system of the plurality of cloud computing systems.

5. The method of claim 1, further comprising modeling at least one cloud computing system of the plurality of cloud computing systems to a configuration management database (CMDB).

6. The method of claim 1, further comprising monitoring a status of at least one application, at least one host, and at least one service of the plurality of cloud computing systems.

7. The method of claim 1, further comprising providing security for the external integration architecture.

8. A system for integrating cloud computing systems, comprising:
    one or more processing units operable to:
        establish a first connection between a cloud computing system architecture and a plurality of cloud computing systems, each of the plurality of cloud computing systems comprising one or more computing resources; and
        integrate the one or more computing resources with an external integration architecture by establishing a second connection between the cloud computing system architecture and the external integration architecture, the external integration architecture comprising a plurality of IT Infrastructure Library (ITIL) software components, the cloud computing system architecture comprising a plurality of management components that provide integration points to connect the plurality of ITIL software components with the one or more computing resources.

9. The system of claim 8, wherein the one or more processing units are operable to negotiate cloud computing costs.

10. The system of claim 8, wherein the one or more processing units are operable to generate a comparative list of one or more published capabilities of the plurality of cloud computing systems.

11. The system of claim 8, wherein the one or more processing units are operable to deploy machine images to at least one cloud computing system of the plurality of cloud computing systems.

12. The system of claim 8, wherein the one or more processing units are operable to model at least one cloud computing system of the plurality of cloud computing systems to a configuration management database (CMDB).

13. The system of claim 8, wherein the one or more processing units are operable to monitor a status of at least one application, at least one host, and at least one service of the plurality of cloud computing systems.

14. The system of claim 8, wherein the one or more processing units are operable to provide security for the external integration architecture.

15. Software for integrating cloud computing systems, the software embodied in a non-transitory computer-readable medium and when executed operable to:
    establish a first connection between a cloud computing system architecture and a plurality of cloud computing systems, each of the plurality of cloud computing systems comprising one or more computing resources; and
    integrate the one or more computing resources with an external integration architecture by establishing a second connection between the cloud computing system architecture and the external integration architecture, the external integration architecture comprising a plurality of IT Infrastructure Library (ITIL) software components, the cloud computing system architecture comprising a plurality of management components that provide integration points to connect the plurality of ITIL software components with the one or more computing resources.

16. The software of claim 15, further operable to negotiate cloud computing costs.

17. The software of claim 15, further operable to generate a comparative list of one or more published capabilities of the plurality of cloud computing systems.

18. The software of claim 15, further operable to deploy machine images to at least one cloud computing system of the plurality of cloud computing systems.

19. The software of claim 15, further operable to model at least one cloud computing system of the plurality of cloud computing systems to a configuration management database (CMDB).

20. The software of claim 15, further operable to monitor a status of at least one application, at least one host, and at least one service of the plurality of cloud computing systems.

* * * * *

UNITED STATES PATENT AND TRADEMARK OFFICE
CERTIFICATE OF CORRECTION

PATENT NO. : 8,069,242 B2
APPLICATION NO. : 12/560754
DATED : November 29, 2011
INVENTOR(S) : Hadar et al.

Page 1 of 1

It is certified that error appears in the above-identified patent and that said Letters Patent is hereby corrected as shown below:

(73) Assignee: delete "Cisco Technology, Inc., San Jose, CA (US)" and insert
--Computer Associates Think, Inc., Islandia, NY (US)--.

Signed and Sealed this
Twenty-eighth Day of February, 2012

David J. Kappos
*Director of the United States Patent and Trademark Office*